Oct. 25, 1960
J. C. HAMILTON
2,957,223
APPARATUS FOR SEVERING CAST MATERIAL
Filed Jan. 15, 1958
2 Sheets-Sheet 1
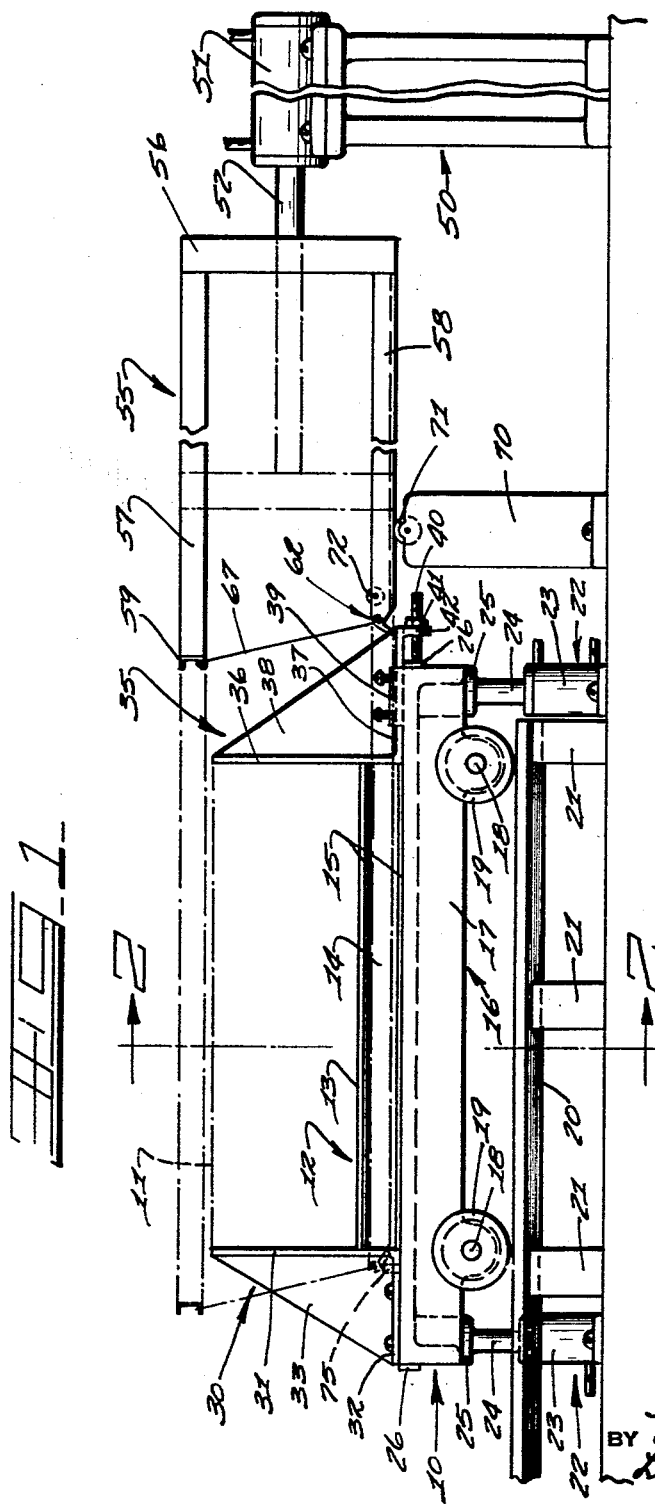
INVENTOR
J. C. HAMILTON
BY
ATTORNEYS Oct. 25, 1960   J. C. HAMILTON   2,957,223
APPARATUS FOR SEVERING CAST MATERIAL
Filed Jan. 15, 1958   2 Sheets-Sheet 2
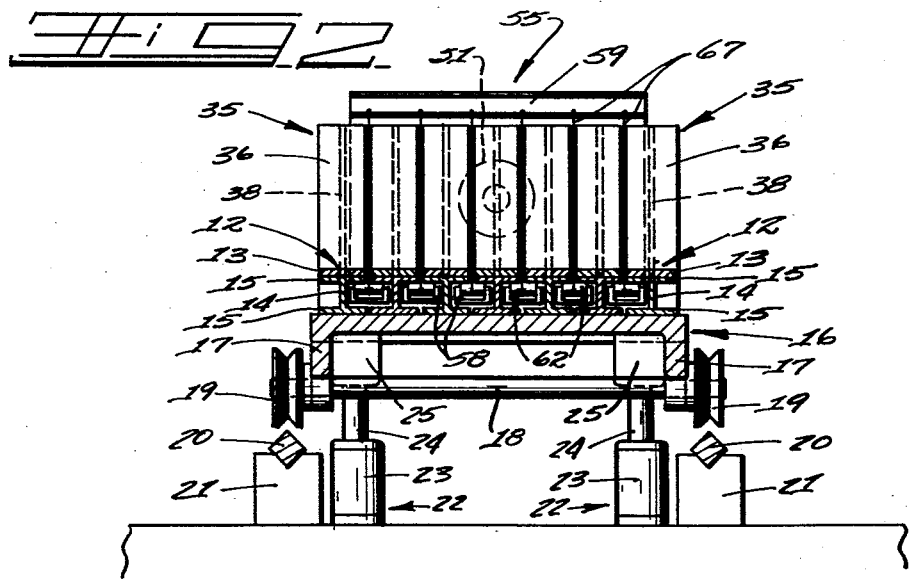
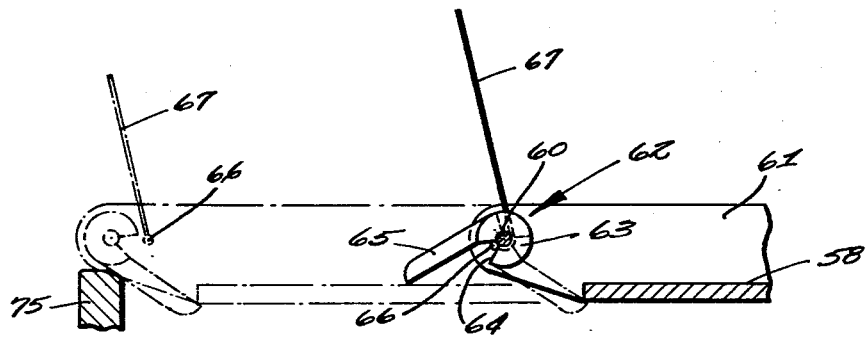
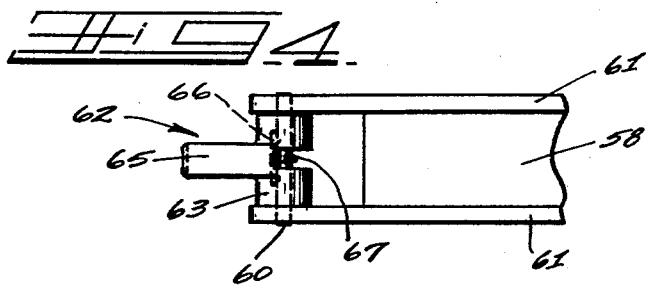
INVENTOR
J. C. HAMILTON
BY
ATTORNEYS United States Patent Office 2,957,223
Patented Oct. 25, 1960

2,957,223

APPARATUS FOR SEVERING CAST MATERIAL

Joseph C. Hamilton, Toledo, Ohio, assignor to Owens-Illinois Glass Company, a corporation of Ohio Filed Jan. 15, 1958, Ser. No. 709,109

3 Claims. (Cl. 25—107)

The present invention relates to an apparatus for severing cast material and more particularly to an apparatus for wire cutting semi-hardened cellular silicates or other cast materials into slabs of desired size.

In the formation of cast foamed concrete or cellular silicate roof deck slabs, partitions, etc., the material is generally cast in multiple molds to facilitate the manufacturing process. For example, in the manufacture of roof deck slabs, the cast silicate is formed in a mold of unit slab length and width dimensions, but of multiple slab thickness dimensions. The silicate material is then allowed to cure, usually at ambient temperature and pressure conditions, to a semi-hardened state, the mold is stripped from the multi-slab cake, and the cake is severed into unit slabs for subsequent final curing in a steam autoclave.

The present invention proposes a new, novel, inexpensive, and simple apparatus for severing the cake into unit slabs. Generally, the present invention proposes the utilization of a U-shaped cutting frame which is telescopically movable over the cake. The frame is moved relative to the cake by suitable means, preferably by power means such as a fluid pressure cylinder or the like to force cutting wires bridging the open end of the U-shaped frame through the cake at unit slab locations. The semi-hardened cake is thus severed into a plurality of individual slabs.

Automatic means are provided for releasing the cutting wires from tension after the cake severing operation has been completed, so that the wires can then be removed from their cutting position and the frame can be moved back to its pre-cutting position without dragging the wires back through the cake. Also, improved cake and slab supporting means are provided to support the calcium silicate body during and after the cutting operation while accommodating the passage of the cutting elements or wires through the cake.

It is, therefore, an important object of the present invention to provide an improved apparatus for severing a semi-hardened calcium silicate cake or the like into a plurality of individual slabs.

Another important object of this invention is the provision of an improved cake-severing apparatus utilizing a cutting frame relatively telescopically movable with respect to the cake and carrying a plurality of cutting elements.

It is a further object of the present invention to provide a new and novel apparatus operable to sever a cake of calcium silicate or the like into a plurality of individual slabs, the apparatus being power energized for telescoping movement over the cake and having automatically releasable cutting elements to facilitate removal of the cutting apparatus from the severed slabs.

Yet another important object of this invention is the provision of a slab-forming apparatus wherein a frame is actuated to straddle a multi-slab cake of calcium silicate or the like, cutting elements being carried by the frame and operative during frame actuation to sever the cake into individual slabs and the cutting elements being releasable following the cutting operation to facilitate removal of the cutting apparatus from the slabs.

Other objects and advantages of the invention will appear from the following detailed description taken in conjunction with the annexed drawings, in which:

On the drawings:

Fig. 1 is an elevational, somewhat schematic illustration of the severing apparatus of the present invention;

Fig. 2 is a sectional view taken along the plane 2—2 of Fig. 1;

Fig. 3 is a fragmentary view illustrating the cutting element locking and releasing means; and Fig. 4 is a plan view of the cutting element locking and releasing means of Fig. 3.

As shown on the drawings:

In Fig. 1, reference numeral 10 refers generally to a supporting means for carrying a cake or block 11 of at least partially cured, self-sustaining material, such as a cake of cellular calcium silicate or "foamed concrete." Such calcium silicate materials are well known in the art and are typically utilized as roof decking materials, interior partition materials, etc. Typical formulations for such materials are contained in the copending United States patent application of W. A. Schaich, Serial No. 702,955, filed December 15, 1957, and assigned to the assignee of the present invention.

More particularly, the cake retaining means 10 comprises an autoclave car upon which the subsequently formed individual slabs may be inserted into, cured in, and removed from a steam autoclave. The cake or block 11 is supported upon a mold bottom 12 which comprises a series of transversely aligned individual plates 13 which are transversely spaced relative to one another for a reason to be hereinafter more fully described. These plates 13 may, if desired, form the bottom of the mold in which the initial calcium silicate slurry was poured and from which side and end walls have been stripped to expose the cake 11. Alternatively, the pre-cured cake may be removed from the mold and transferred to the plates 13.

The plates 13 are superimposed on supporting I-beams 14, one such I-beam 14 underlying each of the plates 13, and the I-beams are spaced transversely to preserve therebetween vertical spaces which are vertically aligned with the spaces between the plates 13. The upper and lower plates 15 of the I-beams 14 are spaced apart (Fig. 2) for a purpose to be hereinafter more fully described. The I-beams 14 are superimposed upon and preferably secured to a main car frame 16 having longitudinally extending dependent flanges 17 supporting longitudinally spaced transverse axles 18 upon which are disposed grooved trolley wheels 19. The trolley wheels 19 are adapted to contact longitudinally extending rails 20 supported above floor level by suitable means, such as supports 21 leading to the autoclave or final curing furnace. To stabilize the cake-supporting means 10, a plurality of identical jacks, indicated generally at 22, are utilized. Preferably, these jacks comprise fluid pressure actuated cylinders 23 having fluid pressure extensible and retractible piston rods 24 carrying upper pads 25.

These pads 25 project upwardly into contact with the car frames 16 when the cylinders 23 are actuated to extend the piston rods 24, so that the car is actually lifted from the rails 20 and is stabilized against lateral and longitudinal displacement. Longitudinal displacement of the car is prevented by abutment of the pads 25 wtih end plates 26 carried by the car and lateral or transverse displacement of the car is prevented by abutment of the pads 25 with the down-turned longitudinal flanges 17. It will be appreciated that actuation of the jacks 22 will elevate the car 10 and immobilize the cake 11.

The car frame 16 also carries a plurality of transversely spaced cake support elements 30 at one end of the car, the elements being longitudinally aligned with the angle irons 14 and the bottom plates 13 and rigid with the car. These support elements 30 comprise an upstanding arm 31 abutting one edge of the cake throughout tis vertical dimension, and a lower longitudinally extending arm 32 secured to the upper surface of the frame 16, and an inclined reinforcing web 33.

Similar supporting elements 35 are carried by the other end of the car. Here, however, the support elements are movable relative to the car. The support elements 35 again comprise upwardly projecting vertical portions 36, longitudinally extending lower portions 37 and reinforcing webs 38. Transversely spaced brackets 39 carried by the car frame 16 overlie the lateral extremities of the longitudinally extending portions 37 to journal the elements 35 for longitudinal adjustment relative to the cake. The extent of such longitudinal adjustment is determined by the threaded adjustment of a screw 40 carried by the frame 16 and passing through an adjusting nut 41 abutting a terminal down-turned flange 42 on the support elements 35. Adjustment of the screw 40 and nut 41 will move the elements 35 into contact with the extremities of the cake 11 and will urge the support elements against the cake to secure the cake between the support elements 30 and 35.

Supported at ground level and projecting thereabove is a standard 50 upon which is superimposed the fluid pressure actuated cylinder 51 having an extensible and retractible piston rod 52. This piston rod carriers at its free extremity a generally U-shaped severing frame, indicated generally at 55, and comprising a vertical support element 56 and longitudinally disposed upper and lower support elements 57 and 58, respectively. The upper support elements 57 terminate in a transversely disposed channel iron 58 which is of a lateral extent slightly less than the lateral extent of the cake 11 (Fig. 2).

The plurality of lower longitudinally extending elements 58 are spaced transversely so as to telescope between the I-beams 14, as best illustrated in Fig. 2. These lower elements carry at their outboard extremities transversely extending pivot pins 60 (Figs. 3 and 4) which are journaled in the opposed upstanding arms 61 of the channeled elements 58. Carried on each of the pivot pins is a wire locking unit 62 comprising a generally cylindrical body 63 having a radial notch 64 formed therein and a tangentially projecting elongated actuating handle 65. The body portion 63 is journaled for rotation on the pivot pin 60 and the notch 62 is adapted to receive a transversely extending locking pin 66 carried at the lower extremity of a cutting wire 67 depending from the upper transverse frame channel 59. To lock the wire 67 under tension, the pin 66 is inserted in the notch when the locking means 62 occupies its open position shown in dotted outline in Fig. 3. The handle 65 is then pulled in a clockwise direction until it assumes the position illustrated in solid outline in Fig. 3. The terminal end of the wire is lapped partially about the pivot pin 60. On this position, tension in the wire merely serves to further tighten the locking element. To release the wire 67 and the terminal lateral extension or pin 66, it is only necessary to turn the locking element to its dotted position of Fig. 3, as will be hereinafter more fully described.

To support the lower lateral extremities of the channels 58 of the frame 55, a vertically extending post 70 is aligned with each of the channels and a supporting roller 71 contacts the undersurface of each of the channels. To facilitate movement of the channel 58 in the spaces between the adjacent I-beams 14, each of the channels carries an upper roller 72 adapted to contact the undersurface of the upper I-beam flange 15.

The operation of the device of the present invention will be readily understood from an inspection of Figs. 1 and 2 of the drawings. Actuation of the fluid pressure cylinder 51 will extend the piston rod 52 to the left, as illustrated in Fig. 1, and the frame 55 will be telescoped over the cake 11, with the channels 58 entering the spaces between the adjacent I-beams 14. The channels 58 will be supported as hereinbefore explained, and the tensioned cutting wires 67 wil be forced through the cake to sever it into individual slabs. Passage of the cutting wires 67 is accommodated by the transverse spacing of the support elements 30 and 35, and the transverse spaces between the bottom plates 13 and the I-beams 14.

Movement of the cutter frame 55 will continue throughout the entire stroke of the piston rod 52. Toward the end of this stroke, each of the locking element handles 65 will come into contact with a fixed abutment 75 interposed in the path of movement of the channels. When these abutments are contacted, further movement of the channels will displace the actuating handle 65 in a counterclockwise direction as illustrated in Fig. 3, turning the notch 66 so that the wire 67 on the terminal pin 66 thereof will be released. The wires thus are released from the lower frame channels 58 and the frame may then be retracted without the necessity of dragging the wires back through the cake. Following the severing operation, the jacks 22 are actuated to retract the piston rods 24, the car 10 is lowered onto the rails 20, and the individual slabs now supported on the car may be moved into the autoclave for curing. After curing, the slabs can be readily removed by merely releasing the support elements 35.

While preferred embodiments have been described above in detail, it will be understood that numerous modifications might be resorted to without departing from the scope of the invention as defined in the following claims.

What I claim is:

1. An apparatus for severing a cake of at least partially cured calcium silicate or the like into a plurality of smaller slabs, comprising means supporting said cake in a fixed position and including a plurality of transversely spaced support surfaces and a plurality of longitudinally extending passages each of which is aligned with the space between adjacent surfaces thereabove, a U-shaped frame longitudinally aligned with said cake and movable longitudinally with respect thereto, said frame including a plurality of forwardly projecting individual lower support elements each of which is enterable into one of said passages, and a plurality of cutting wires bridging the open leading end of said frame, one such wire being releasably secured to each of said lower support elements, power means for actuating said frame longitudinally over said cake to telescope said frame about said cake and to insert said individual lower support elements into the passages aligned therewith, respectively, thereby forcing said cutting wires through said cake, and means automatically operable following passage of said wires through said cake to release said wires for removal from said cake and said frame, said last named means including latch means carried by said frame and releasably securing said wires thereto and abutment means carried by the cake supporting means for actuating said latch means.

2. An apparatus for severing a cake of at least partially cured calcium silicate or the like into a plurality of smaller slabs, comprising means supporting said cake in a fixed position, a U-shaped frame longitudinally aligned with said cake and movable longitudinally with respect thereto, a plurality of cutting wires bridging the open leading edge of said frame, releasable latch means fixing said wires to said frame, power means for actuating said frame longitudinally of said cake to telescope said frame thereover and to force said cutting wires therethrough, and means on said supporting means abuttable with said latch means following passage of said wires through said cake to release said latch means, thereby freeing wires for removal from said cake and said frame.

3. An apparatus for severing a cake of at least partially cured calcium silicate or the like into a plurality of smaller slabs, comprising means supporting said cake in a fixed position and includng transversely spaced bottom supports and adjustable end clamps, a U-shaped frame longitudinally aligned with said cake and movable longitudinally with respect thereto, said frame including upper support elements movable over said bottom supports and end clamps and lower support elements movable beneath said bottom supports, a plurality of cutting wires bridging the open leading edge of said frame and aligned with the spaces between said bottom supports and said end clamps, releasable wire clamping means on said lower support elements securing said wires thereto, power means for actuating said frame longitudinally of said cake to telescope said frame thereover and to force said cutting wires therethrough, and abutments on said cake supporting means contactable with said wire clamping means following passage of said wires through said cake to release said wires for removal from said cake and said frame.

References Cited in the file of this patent
UNITED STATES PATENTS

| | | |
|---|---|---|
| 515,383 | Wallace et al. | Feb. 27, 1894 |
| 532,222 | Thompson | Jan. 8, 1895 |
| 852,107 | Cunningham | Apr. 30, 1907 |
| 2,099,119 | King | Nov. 16, 1937 |
| 2,451,027 | Gano et al. | Oct. 12, 1948 |
| 2,694,846 | Olsson | Nov. 23, 1954 |

FOREIGN PATENTS

| | | |
|---|---|---|
| 1,078,030 | France | May 5, 1954 |
| 154,511 | Sweden | May 15, 1956 |
| 1,146,174 | France | May 20, 1957 |